May 13, 1969     A. SARLO     3,443,657
POWER MOWER DRIVE MECHANISM
Filed Oct. 9, 1967
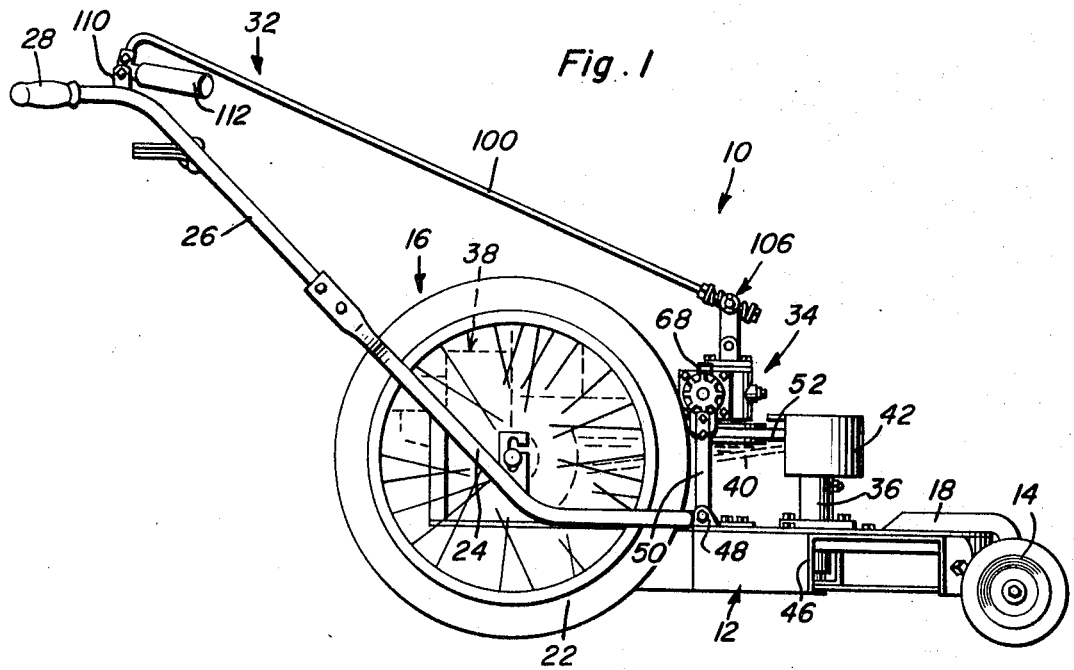
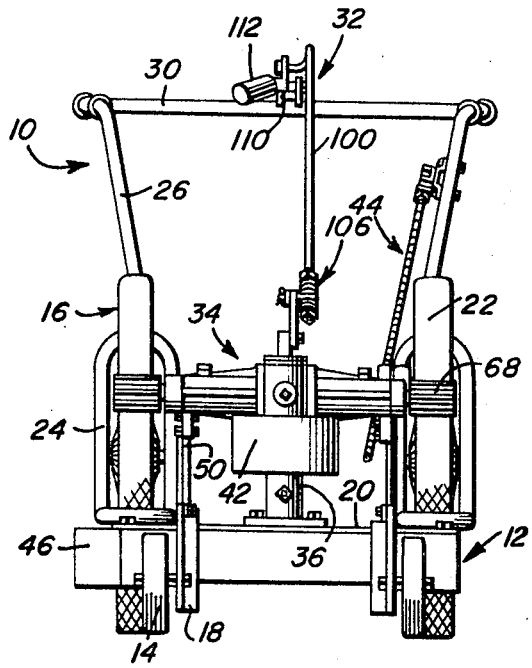
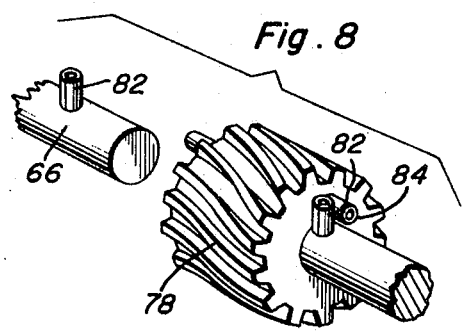
Anthony Sarlo
*INVENTOR.*

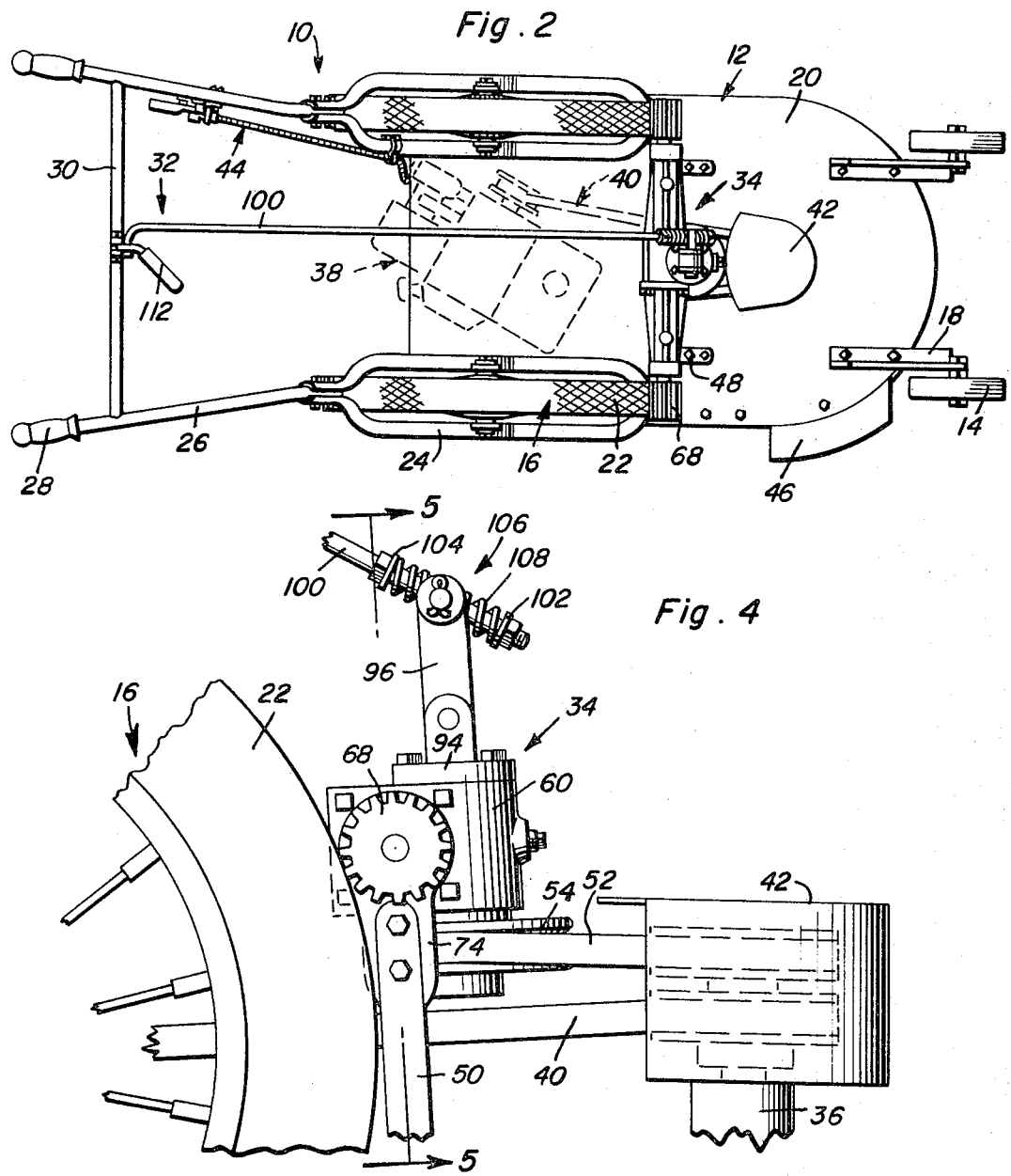

May 13, 1969            A. SARLO            3,443,657

POWER MOWER DRIVE MECHANISM

Filed Oct. 9, 1967            Sheet 3 of 3

Anthony Sarlo
INVENTOR.

BY *Clarence A. O'Brien*
*and Harvey B. Jacobson*
Attorneys

United States Patent Office 3,443,657
Patented May 13, 1969

3,443,657
POWER MOWER DRIVE MECHANISM
Anthony Sarlo, 2315 Anderson Ave.,
Fort Myers, Fla. 33901
Filed Oct. 9, 1967, Ser. No. 673,909
Int. Cl. A01d 35/26; B62d 51/04
U.S. Cl. 180—74
14 Claims

ABSTRACT OF THE DISCLOSURE

A propelling mechanism for engine powered mowers with relatively large, pneumatic tired wheels. The wheel tires are engageable by toothed drive elements rotated through a gear assembly extending transversely between the wheels and pivotally mounted on the frame assembly of the mower between the wheels and the power operated rotor hub to which the gear assembly is connected through an endless belt drive.

---

This invention relates to self-propelled power mowers and more particularly to a selectively controlled vehicle propelling mechanism for power mowers.

In connection with heavy-duty power mowers with which the present invention is concerned, it is essential that a propelling mechanism be provided which will not only be effective and immediately responsive to control of the operator, but will also be capable of operating effectively without rapid wear of parts. It is also essential, that the propelling mechanism be capable of accommodating variations in torque loading so as to unnecessarily avoid excessive loading of the mower engine.

In accordance with the present invention, the propelling mechanism includes a transversely elongated gear housing journaling a pair of drive axles, the ends of which are connected to toothed drive elements adapted to frictionally engage the periphery of the pneumatic tired traction wheels supporting the mower frame. The gear housing is accordingly pivotally mounted on the mower frame forwardly of the traction wheels for displacement by a control rod which mounts centering springs for yieldably holding the gear housing in an unloaded position with the drive elements closely spaced from the traction wheels. An endless belt drive drivingly connects the gear assembly to the rotor hub of the mower which is powered by the engine also supported on the mower frame. When the gear housing is rearwardly displaced by means of the control rod and the centering springs in order to bring the drive elements into driving engagement with the traction wheels, the drive belt drivingly connecting the gearing assembly to the rotor hub is further tensioned so as to transmit maximum torque when the gear assembly is loaded. On the other hand, when the gear assembly is unloaded with the drive elements spaced from the traction wheels, the drive belt transmits rotation through the gear assembly to the drive elements under a reduced tension. Thus, the inertia of the rotating drive elements when engaged with the traction wheels will compensate for the abrupt loading imposed on the engine. Further, the gear assembly is provided with separate lost motion drive connections to the drive elements in order to provide a differential torque transmitting action thereby accommodating difference in load imposed on the traction wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a typical power mower with which the propelling mechanism of the present invention is associated.

FIGURE 2 is a top plan view of the self-propelled mower shown in FIGURE 1.

FIGURE 3 is a front elevational view of the power mower.

FIGURE 4 is an enlarged partial side elevational view of the power mower showing in particular the propelling mechanism.

FIGURE 8 is a perspective view of certain disassembled portions of the propelling mechanism.

Figure 5:
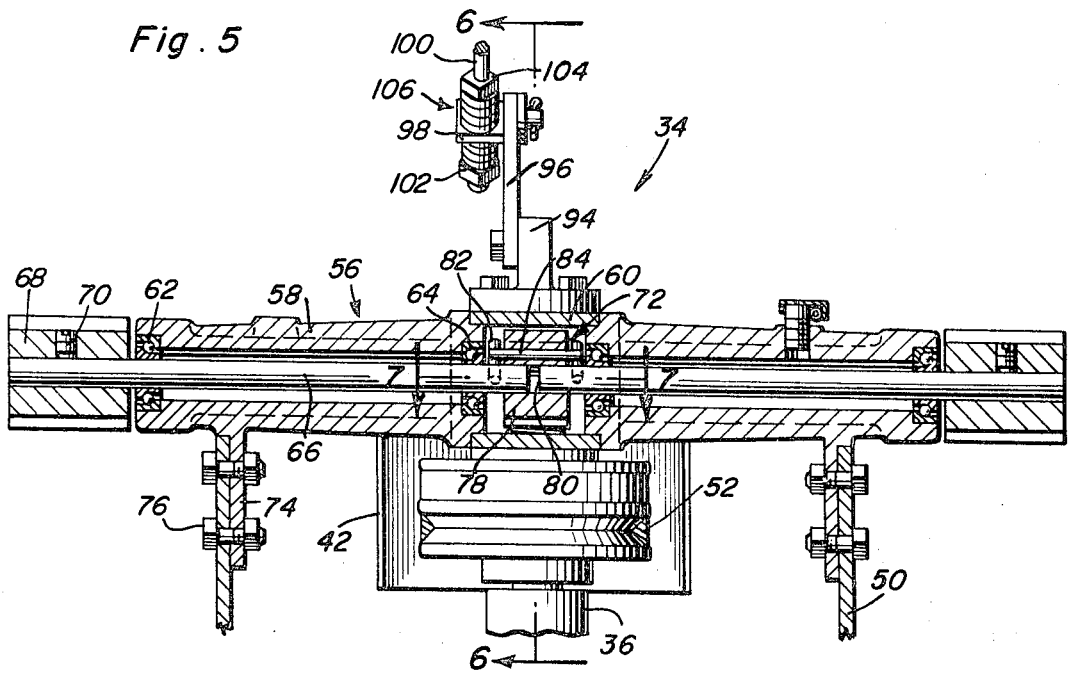
FIGURE 5 is a sectional view taken substantially through a plane indicated by section line 5—5 in FIGURE 4.

Referring now to the drawings in detail, FIGURES 1, 2 and 3 illustrate a self-propelled power mower generally referred to by reference numeral 10 which comprises a frame assembly 12 supported in spaecd relation above the ground by means of a pair of relatively small forward wheels 14 and a pair of relatively large rear wheels 16. The forward wheels are rotatably supported forwardly of the frame assembly by a pair of support brackets 18 secured to and projecting forwardly from the top deck 20 of the frame assembly. The rear wheels 16 are provided with pneumatic tires 22 having peripheral traction tread thereon. The traction wheels 16 are rotatably mounted in laterally spaced relation to each other by tubular mounting frames 24 which are secured to the frame assembly 12 and extend rearwardly and upwardly therefrom. The wheel mounting frames are fastened to a handle assembly including a pair of handle bars 26 provided with handgrips 28 at the rear ends and interconnected by a crossbar 30 on which one end of a selective control 32 is mounted. The control 32 is operatively connected at its forward end to a propelling mechanism generally referred to by reference numeral 34 that extends transversely across the frame assembly in front of the rear traction wheels 16 but rearwardly of a rotor hub 36 to which the mower blades are connected below the deck 20 of the frame assembly.

The frame assembly is adapted to mount on the deck 20 a power plant 38 as shown by dotted line in FIGURES 1 and 2 located rearwardly of the propelling mechanism 34. The power plant which may be in the form of an internal combustion engine is drivingly connected to the rotor hub 36 by means of an endless drive belt 40 entrained about a pulley wheel 51 connected to the rotor hub within the drive belt guard 42 located forwardly of the propelling mechanism 34. The engine 38 may be controlled through a throttle control 44 mounted on one of the handle bars 26 as shown in FIGURES 2 and 3. Operation of the engine will accordingly rotate the rotor blades (not shown) in the usual manner to cut vegetation which is discharged from below the deck 20 of the mower frame assembly through a lateral discharge 46.

The propelling mechanism is pivotally mounted on the deck 20 of the frame assembly by a pair of laterally spaced pivot brackets 48 to which the lower ends of links 50 are pivotally connected supporting the propelling mechanism in vertically spaced relation above the deck 20 of the frame assembly. Thus, the drive belt 40 interconnecting the power plant 38 with the rotor hub extends below the propelling mechanism. As shown in FIGURE 5, the upper end of the rotor hub 36 is provided with a pulley wheel 53 about which a yieldable drive belt 52 is entrained for transferring power from the engine to the propelling mechanism. The propelling mechanism is accordingly provided with a driven pulley 54 about which the endless drive belt 52 is entrained.

Figure 6:
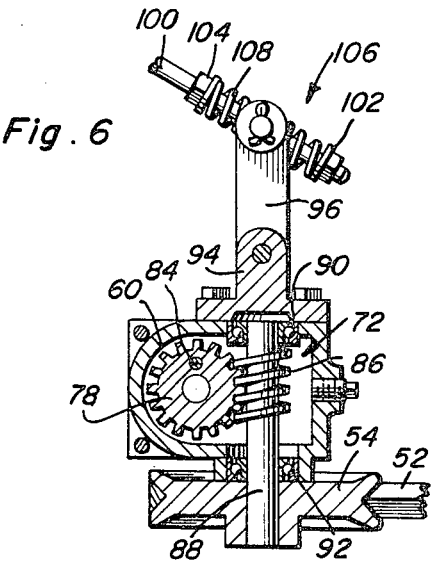
FIGURE 6 is a sectional view taken substantially through a plane indicated by section line 6—6 in FIGURE 5.
Figure 7:
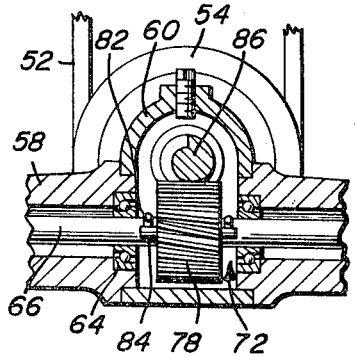
FIGURE 7 is a partial sectional view taken substantially through a plane indicated by section line 7—7 in FIGURE 5.

As shown in FIGURES 5, 6 and 7, the propelling mechanism is provided with a housing assembly generally referred to by reference numeral 56 which includes a pair of tubular housing sections 58 interconnected by a gearing casing 60. Bearing assemblies 62 and 64 are mounted at opposite ends in each of the tubular housing sections 58 for journalling drive axles 66. The axles 66 form a shaft assembly through which torque is transmitted to a pair of toothed drive transfer elements 68 secured to axially projecting ends of the axle 66 by the setscrews 70. The inner ends of the axles 66 extend into the gear casing 60 within which they are operatively connected to a torque transmitting gear assembly 72. The tubular housing sections 56 are provided with downwardly depending mounting arms 74 receiving the upper end portions of the mounting links 50 to which they are fastened by the fastener assemblies 76. Thus, the housing assembly 56 may be pivotally displaced from an inactive position as illustrated in FIGURE 1 to a torque transmitting position wherein the drive transfer elements 68 engage the traction wheels 16 for transferring torque thereto.

The torque transmitting gear assembly 72 as shown in FIGURES 5, 6, 7 and 8 includes a worm wheel 78 rotatably mounted on the adjacent ends 80 of the axles 66 within the gear casing 60. Radial drive pins 82 project from the adjacent end portions of the drive axles on opposite sides of the worm wheel axially between the worm wheel and the bearings 64 as more clearly seen in FIGURE 5. Accordingly, the drive pins axially hold the drive axles and the worm wheel in assembled relation to each other within the housing assembly 56. Further, a drive engaging pin 84 is mounted by the worm wheel and projects axially from opposite sides thereof so as to drivingly engage the radial drive pins 72 when the worm wheel is rotated. Thus, a lost motion connection is established between the worm wheel 78 and the drive transfer elements 68 to which the drive axles 66 are connected. The worm wheel 78 is driven during operation of the engine 38 through a worm gear 86 connected to the pulley wheel 54 by means of the worm shaft 88 journalled within the gear casing 60 by the spaced bearings 90 and 92 as shown in FIGURE 6.

The gear casing 60 has secured to the top thereof, a connecting bracket 94 to which an upstanding link 96 is connected. Pivotally mounted at the upper end of the link 96, is a bearing plate 98 as more clearly seen in FIGURE 5 through which the end portion of control rod 100 slidably extends, the control rod being associated with the selective control 32 aforementioned. Mounted on the control rod in adjustably spaced relation on opposite sides of the bearing plate 98, are a pair of thrust assemblies 102 and 104 forming a part of a yieldable holding device 106 which also includes a pair of centering springs 108 mounted on the control rod between the bearing plate 98 and the thrust assemblies 102 and 104.

It will be apparent therefore, that the yieldable holding device 106 will normally hold the housing in an inactive position with the drive transfer elements 68 closely spaced from the rims of the wheels 16. The upper end of the control rod 100 is pivotally mounted by the pivot bracket 110 on the cross bar 30 by means of a crank arm to which the control handle 112 is connected. Accordingly, the operator by upwardly moving the handle will through the centering spring 108 yieldably displace the housing in a rearward direction in order to bring the drive transfer elements 68 into drive engagement with the tires 22 of the traction wheels 16. In doing so, the drive belt 52 will be further tensioned so as to increase the torque transmitted from the rotor hub 36 to the propelling mechanism 34.

Because of the yieldability of the drive belt 52 and the variable torque transmitted therethrough, the yieldable positioning of the gear housing assembly 56 by means of the centering device 106, and the lost motion connections associated with the torque transmitting gear assembly 72, the mower may be propelled under the selective control of the operator in such a manner as to accommodate variations in loading by corresponding variations in the torque transmitted to the traction wheels. For example, while both wheels will be rotated by the torque transmitting gear assembly 72 at the same speed, a greater amount of torque will be transmitted to the wheel that is more heavily loaded by means of the drive pins 84 and 82. Further, any excessive loading of either or both wheels will cause forward displacement of the gear housing against the centering springs 108 with a consequential reduction in the torque transmitted by reducing the tension of the drive belt 52. The operator may then increase the torque transmitted as well as to increase the pressure of the drive transfer element 68 on the tires 22 by further upward displacement of the control handle 112. Despite the automatic and selective regulation of the torque transmitted for propelling purposes the propelling mechanism 34 is relatively simple to install and may continue to operate indefinitely since operation of the mechanism does not become adversely effected by wear of any parts as is the case of drive mechanisms that employ friction clutches.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a wheeled frame assembly having a powered mechanism supported thereon and a pair of spaced traction wheels, propelling means comprising a pair of axially aligned driven shafts, a pair of drive transfer elements connected to the driven shafts, a common housing rotatably mounting the driven shafts, means pivotally mounting the housing on the frame assembly for simultaneous displacement of the drive transfer elements from inactive positions into engagement with the traction wheels, torque transmitting means operatively connected to the driven shafts, yieldable drive means drivingly connecting said powered mechanism to the torque transmitting means for rotation of the drive transfer elements in said inactive positions, means engageable with the housing for yieldably holding the drive transfer elements in said inactive positions, and selective control means connected to the housing for simultaneously displacing the drive transfer elements into engagement with the traction wheels and increasing the torque transmitted by the yieldable drive means to the torque transmitting means.

2. The combination of claim 1 wherein said selective control means includes a control rod slidably connected to the housing, said yieldable holding means comprising a pair of centering springs mounted on the control rod in engagement with the housing.

3. The combination of claim 1 wherein said housing includes a pair of tubular sections and a gear casing interconnecting the tubular sections enclosing the torque transmitting means.

4. The combination of claim 1 wherein said torque transmitting means comprises a drive wheel rotatably mounted on adjacent end portions of the driven shafts, a drive gear connected to the yieldable drive means in constant mesh with the drive wheel, a pair of radial pins projecting from the adjacent end portions of the shafts holding the drive wheel and the shafts in axially assembled relation, and drive engageing means extending axially from the drive wheel for drive engagement with said radial pins in response to rotation of the drive wheel.

5. In combination with a wheeled frame assembly having a powered mechanism supported thereon and a pair of spaced traction wheels, propelling means comprising a driven shaft assembly, a pair of drive transfer elements connected to the driven shaft assembly, a housing extending axially between said drive transfer elements rotatably mounting the driven shaft assembly, means movably mounting the housing on the frame assembly for simultaneous displacement of the drive transfer elements from unload positions into engagement with the traction wheels, lost motion transmitting means operatively connected to the driven shaft assembly within the housing accommodating limited angular movement of the drive transfer elements relative to each other, yieldable drive means drivingly connecting said powered mechanism to the transmitting means for rotation of the drive transfer elements in said inactive positions, means engageable with the housing for yieldably holding the drive transfer elements in said unloaded positions, and selective control means connected to the housing for displacing the drive transfer elements into engagement with said traction wheels.

6. The combination of claim 5 wherein said housing includes a pair of tubular sections and a gear casing interconnecting the tubular sections enclosing the transmitting means, said shaft assembly including a pair of axles respectively journaled in said tubular sections having adjacent end portions interconnecting the drive transfer elements with the transmitting means.

7. In combination with a wheeled frame assembly having a powered mechanism supported thereon and a pair of spaced traction wheels, propelling means comprising a driven shaft assembly, a pair of drive transfer elements connected to the driven shaft assembly, a housing rotatably mounting the driven shaft assembly, means pivotally mounting the housing on the frame assembly for displacement of the drive transfer elements from inactive positions into engagement with the traction wheels, torque transmiting means housing, yieldable drive means drivingly connecting said powered mechanism to the torque transmitting means for rotation of the drive transfer elements in said inactive positions, means engageable with the housing for yieldably holding the drive transfer elements in said inactive positions, and selective control means connected to the housing for simultaneously displacing the drive transfer elements into engagement with the traction wheels and increasing the torque transmitted by the yieldable drive means to the torque transmitting means, said housing including a pair of tubular sections and a gear casing interconnecting the tubular sections enclosing the torque transmitting means, said shaft assembly including a pair of axles respectively journaled in said tubular sections having adjacent end portions interconnecting the drive transfer elements with the torque transmitting means, said transmitting means comprising a worm wheel rotatably mounted on said adjacent end portions of the axles, a worm gear connected to the yieldable drive means in constant mesh with the worm wheel, a pair of radial pins projecting from the adjacent end portions of the axles within the gear casing holding the worm wheel and the axles in axially assembled relation, and drive engaging means extending axially from the worm wheel for drive engagement with said radial pins in response to rotation of the worm wheel.

8. The combination of claim 7 wherein said yieldable drive means includes an endless friction belt under tension which is further tensioned in response to said displacement of the drive transfer elements from the inactive positions.

9. In combination with a wheeled frame assembly having a powered mechanism supported thereon and a pair of spaced traction wheels, propelling means comprising a driven shaft assembly, a pair of drive transfer elements connected to the driven shaft assembly, a housing rotatably mounting the driven shaft assembly, means pivotally mounting the housing on the frame assembly for displacement of the drive transfer elements from inactive positions into engagement with the traction wheels, torque transmitting means operatively connected to the driven shaft assembly within the housing, yieldable drive means drivingly connecting said powered mechanism to the torque transmitting means for rotation of the drive transfer elements in said inactive positions, means engageable with the housing for yieldably holding the drive transfer elements in said inactive positions, and selective control means connected to the housing for simultaneously displacing the drive transfer elements into engagement with the traction wheels and increasing the torque transmitted by the yieldable drive means to the torque transmitting means, said selective control means including a control rod slidably connecting to the housing, said yieldable holding means comprising a pair of centering springs mounted on the control rod in engagement with the housing.

10. The combination of claim 9 wherein said yieldable drive means includes an endless friction belt under tension which is further tensioned in response to said displacement of the drive transfer elements from the inactive positions.

11. The combination of claim 10 wherein said housing includes a pair of tubular sections and a gear casing interconnecting the tubular section enclosing the torque transmitting means, said shaft assembly including a pair of axles respectively journaled in said tubular sections having adjacent end portions interconnecting the drive transfer elements with the torque transmitting means.

12. The combination of claim 11 wherein said torque transmitting means comprises a worm wheel rotatably mounted on said adjacent end portions of the axles, a worm gear connected to the yieldable drive means in constant mesh with the worm wheel, a pair of radial pins projecting from the adjacent end portions of the axles within the gear casing holding the worm wheel and the axles in axially assembled relation, and drive engaging means extending axially from the worm wheel for drive engagement with said radial pins in response to rotation of the worm wheel.

13. In combination with a wheeled frame assembly having a powered mechanism supported thereon and a pair of spaced traction wheels, propelling means comprising a driven shaft assembly, a pair of drive transfer elements connected to the driven shaft assembly, a housing rotatably mounting the driven shaft assembly, means movably mounting the housing on the frame assembly for displacement of the drive transfer elements from unload positions into engagement with the traction wheels, torque transmitting means operatively connected to the driven shaft assembly within the housing, yieldable drive means drivingly connecting said powered mechanism to the torque transmitting means for rotation of the drive transfer elements in said inactive positions, means engageable with the housing for yieldably holding the drive transfer elements in said unloaded positions, and selective control means connected to the housing for displacing the drive transfer elements into engagement with said traction wheels, said housing including a pair of tubular sections and a gear casing interconnecting the tubular sections enclosing the torque transmitting means, said shaft assembly including a pair of axles respectively journaled in said tubular sections having adjacent end portions interconnecting the drive transfer elements with the torque transmitting means, said torque transmitting means comprising a worm wheel rotatably mounted on said adjacent end portions of the axles, a worm gear in constant mesh with the worm wheel, a pair of radial pins projecting from the adjacent end portions of the axles within the gear casing holding the worm wheel and the axles in axially assembled relation, and drive engaging means extending axially from the worm wheel for drive engagement with said radial pins in response to rotation of the worm wheel.

14. The combination of claim 13 wherein said yieldable drive means includes an endless friction belt under tension which is further tensioned in response to said displacement of the drive transfer elements from the unloaded positions.

References Cited

UNITED STATES PATENTS 2,691,421   10/1954   Swanson _____ 180—74

A. HARVEY LEVY, *Primary Examiner.*

U.S. Cl. X.R.

180—19